United States Patent
Nisius

(10) Patent No.: US 7,562,823 B2
(45) Date of Patent: Jul. 21, 2009

(54) PRINTING DEVICE

(75) Inventor: Raimund Nisius, Berlin (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 408 days.

(21) Appl. No.: 11/328,484

(22) Filed: Jan. 9, 2006

(65) Prior Publication Data

US 2006/0151603 A1 Jul. 13, 2006

(30) Foreign Application Priority Data

Jan. 8, 2005 (DE) .................. 20 2005 000 255 U

(51) Int. Cl.
*G06K 7/10* (2006.01)
(52) U.S. Cl. ................ 235/462.01; 235/462.09; 235/462.16
(58) Field of Classification Search .......... 235/462.01, 235/462.09, 462.16
See application file for complete search history.

(56) References Cited

U.S. PATENT DOCUMENTS

| | | | |
|---|---|---|---|
| 3,977,007 A | | 8/1976 | Berry et al. |
| 5,123,352 A * | | 6/1992 | Luttrell ........................ 101/375 |
| 5,387,976 A | | 2/1995 | Lesniak |
| 5,835,615 A * | | 11/1998 | Lubow et al. ............... 382/112 |
| 6,007,175 A | | 12/1999 | Tanahashi |
| 6,084,609 A | | 7/2000 | Manini et al. |
| 6,154,227 A | | 11/2000 | Lund |
| 6,478,223 B1 * | | 11/2002 | Ackley ................... 235/462.04 |
| 6,726,104 B2 * | | 4/2004 | Schuessler et al. ...... 235/462.09 |
| 7,299,989 B2 * | | 11/2007 | Schuessler ................... 235/484 |
| 2002/0135626 A1 | | 9/2002 | Sato et al. |
| 2003/0048319 A1 | | 3/2003 | Sato |
| 2004/0041868 A1 | | 3/2004 | Maru et al. |
| 2004/0119767 A1 | | 6/2004 | Takekoshi et al. |
| 2005/0001866 A1 | | 1/2005 | Eguchi et al. |

FOREIGN PATENT DOCUMENTS

| | | |
|---|---|---|
| DE | 26 23 768 | 12/1976 |
| DE | 694 15 214 T2 | 12/1994 |
| DE | 694 20 664 T2 | 5/1995 |
| DE | 698 16 946 T2 | 7/2004 |
| EP | 0 627 314 B1 | 6/1999 |
| EP | 0 650 839 B1 | 12/1999 |
| JP | 620 62 767 | 3/1987 |

* cited by examiner

*Primary Examiner*—Ahshik Kim
(74) *Attorney, Agent, or Firm*—Laurence A. Greenberg; Werner H. Stemer; Ralph E. Locher

(57) ABSTRACT

A printing device has a print head which operates according to the inkjet principle and a control device which actuates the print head for producing a two-dimensional barcode. The barcode contains a matrix composed of a plurality of image fields. The barcode contains at least one first image field which is printed with a plurality of image points by the print head and at least one second image field which is substantially unprinted. The control device is configured for converting barcode data which define the position and size of the image fields into actuating signals for the print head. The control device is configured for converting the barcode data into actuating signals for the print head in such a way that at least one first image field is printed with a lower number of image points than corresponds to the barcode data.

29 Claims, 2 Drawing Sheets

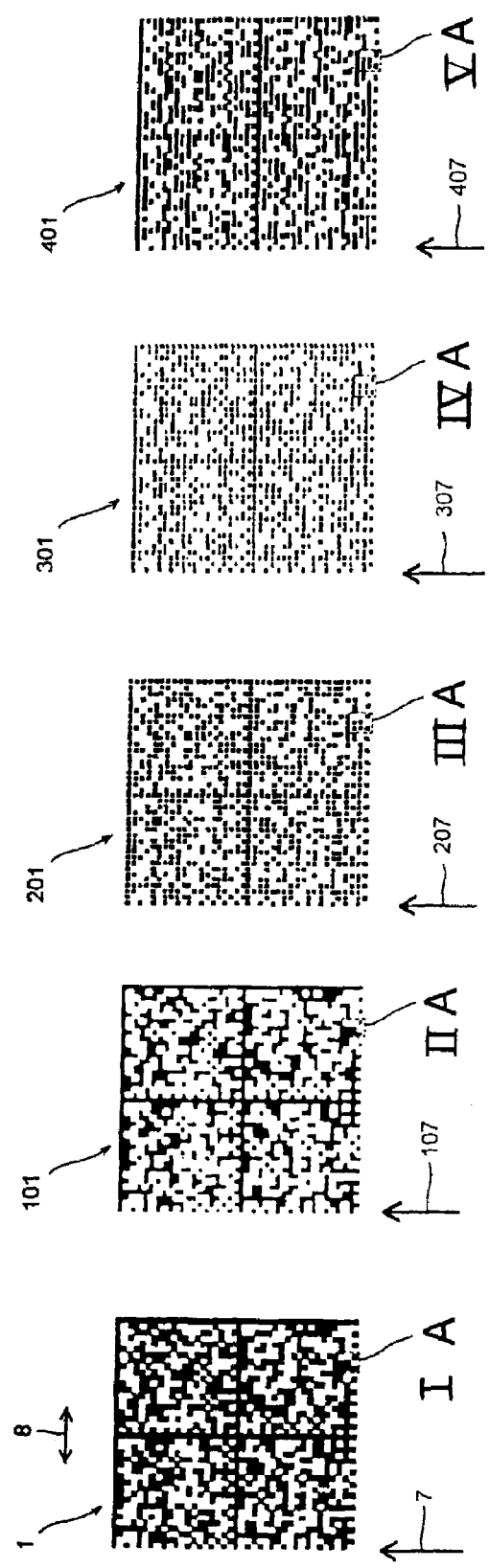

PRINTING DEVICE

CROSS-REFERENCE TO RELATED APPLICATION

This application claims the priority, under 35 U.S.C. § 119, of German patent application DE 20 2005 000 255.0, filed Jan. 8, 2005; the entire disclosure of the prior application is herewith incorporated by reference.

BACKGROUND OF THE INVENTION

Field of the Invention

The present invention relates to a printing device having a print head which operates according to the inkjet principle and a control device which actuates the print head for producing a two-dimensional barcode. The barcode contains a matrix composed of a plurality of image fields and at least one first image field which is printed with a plurality of image points by the print head and at least one second image field which is substantially unprinted. The control device is configured for converting barcode data which define the position and size of the image fields into actuating signals for the print head. Furthermore, it relates to a corresponding printed barcode.

What are known as two-dimensional barcodes are used for a series of applications. A two-dimensional barcode of this type is a matrix-like configuration of image fields or color areas, what are known as modules, of the same size, the lightness value ("light" or "dark") of which is interpreted in each case as one bit of information. Thus, for example, the Canadian postal service requires a two-dimensional barcode of this type for its franking imprints, using the data matrix code ECC200 having a size of 40×40 square modules of the same size on a franking area having a height of 1 inch.

Here, if printers which operate according to the inkjet principle are used, there is the problem, first, that the image points which are produced by the ink do not produce a sharp image of the respective module on the substrate which is used, for example paper. The ink bleeds to form a dot which is not rectangular, the shape and size of which depend on parameters such as ink viscosity, surface tension, paper quality, ink amount, etc. The printed area tends to be larger than the exact area which actually corresponds to the barcode data used to produce the barcode. This has the consequence for the printed barcode that the area of a printed, "dark" module is greater than the area of a "light" module that is not printed. This frequently leads to reading errors when the barcode is read. The reading device which is used then has to use the error correction bits of the barcode in order to obtain corresponding information. Depending on the quality of the barcode, this check also fails in some circumstances, with the result that the information of the barcode cannot be read.

A further problem frequently lies in the resolution of the print head which is used. If, in addition to the instruction about the number of image fields, that is to say modules, of the barcode, there are additionally instructions regarding the overall dimensions of the barcode, as is frequently the case in franking imprints, it can be necessary in some circumstances, depending on the resolution of the print head which is used, to use a considerably smaller number of nozzles than is available for the production of the modules. If, for example, the above-described barcode of the Canadian postal service is to be printed with a resolution of 192 dpi, a maximum of four nozzles can be used for each module, in order to produce modules of identical size. Only 160 nozzles of the print head are therefore used, instead of the 192 nozzles. As a result, the respective module becomes smaller, as a result of which the above-described problems when reading the barcode are increased further.

SUMMARY OF THE INVENTION

It is accordingly an object of the invention to provide a printing device which overcomes the above-mentioned disadvantages of the prior art devices of this general type, which ensures satisfactory legibility of the barcode, in particular, in a simple manner.

With the foregoing and other objects in view there is provided, in accordance with the invention, a printing device. The printing device has a print head operating according to an inkjet principle and a control device actuating the print head for producing a two-dimensional barcode. The barcode contains a matrix composed of a plurality of image fields. The image fields contain at least one first image field being printed with a plurality of image points by the print head and at least one second image field being substantially unprinted. The control device converts barcode data defining a position and size of the image fields into actuating signals for the print head. The control device converts the barcode data into the actuating signals for the print head such that the at least one first image field is printed with a lower number of the image points than corresponds to the barcode data.

The present invention is based on the technical teaching that improved legibility of the two-dimensional barcode is attained if the control device is configured for converting the barcode data into actuating signals for the print head in such a way that at least one first image field is printed with a lower number of image points than corresponds to the barcode data.

As a result of the reduction according to the invention in the number of image points, that is to say the ink droplets, with which the first image field is printed, compared with the number which is stipulated theoretically by the barcode data, an imprint can be attained in a simple manner, in which imprint an improved area ratio of the printed, "dark" modules and the "light" modules which are not printed results, with the bleeding ink being taken into consideration. This has a positive effect on the legibility of the barcode.

Furthermore, it is possible with the present invention to produce a smaller image field at some locations by reducing the number of image points at some locations, that is to say the number of ink droplets with which the first image field is printed, compared with the number which is stipulated theoretically by the barcode data, while larger image fields which are easier to read as a rule are produced in other regions. In this way, the barcode can be adapted in a simple manner to the respective resolution of the print head which is used, with the result that as large a number as possible of the nozzles present on the print head can be used.

Therefore, there is preferably provision for the control device to be configured for converting the barcode data into actuating signals for the print head in such a way that at least one first image field is printed with a smaller size than corresponds to the barcode data. In order to minimize or preclude the risk caused by this of poorer legibility, there is preferably provision for the first image field of reduced size to be disposed in a region of the barcode which contains no useful information. Regions of this type without useful information which serve, for example, only for positional and/or raster detection are present as a rule in all customary two-dimensional barcodes.

In principle, the image points can be omitted at any desired location. Thus, for example, only local thinning or thinning which covers an area can be provided, with the result that overall a smaller amount of ink is applied to a defined area, which amount of ink then bleeds to a smaller extent. Here, in the context of the present invention, "thinning" is to be understood as meaning that individual image points are omitted in one direction at defined fixed or variable intervals.

However, it is particularly advantageous if the image points are omitted in the edge region of the first image field, as the above described problems come to bear in a particularly pronounced manner in this edge region. The control device is therefore configured for omitting image points in at least one first edge section of the first image field. It also possible here that once again only thinning of the edge section is provided. However, the control device is preferably configured for omitting at least one first row of adjacent image points in at least one first edge section of the first image field.

The first edge section can be disposed in any desired regions of the first image field. The effect is particularly advantageous if the first edge section adjoins a second image field, as the above described problems with bleeding of the ink into an image field which is not printed could occur precisely in this region and can be avoided with the invention. Therefore, there is preferably provision for the control device to be configured for omitting image points in all edge sections of the first image field which adjoin a second image field.

The omission of image points can be limited to individual first image fields. For example, these can be only those first image fields which are adjoined at least over a defined length by a second image field. In further advantageous variants of the printing device according to the invention, the control device is configured for omitting image points in at least one first edge section of all first image fields. Here, it is not then necessary to take the adjacent image fields into consideration, as a result of which the processing expenditure and thus also the expenditure on the control device are particularly low. The first edge section preferably points in each case in a first direction. In other words, the first edge section in the first image fields is disposed in each case at the same location.

In order to achieve the above described adaptation of the barcode to the resolution of the print head, there is preferably provision for the control device to be configured for converting the barcode data into actuating signals for the print head in such a way that, at least in a first direction, every i-th image field has a smaller size in the first direction than corresponds to the barcode data. Here, the first direction then preferably extends perpendicularly with respect to the printing direction, that is to say the direction of the relative movement between the print head and the substrate. In order to attain a corresponding action optionally also in the printing direction, the control device is preferably configured for converting the barcode data into actuating signals for the print head in such a way that, in a second direction which extends transversely with respect to the first direction, every k-th image field has a smaller size in the second direction than corresponds to the barcode data.

In order to keep the distortion of the barcode low, there can be provision for i to equal k. The following size distribution of the image fields therefore then results in a barcode region containing i×i image fields and having a normal size of n×n image points:

(i−1)×(i−1) image fields having the size n×n image points,
(i−1) image fields having the size n×(n−1) image points,
(i−1) image fields having the size (n−1)×n image points,
one image field having the size (n−1)×(n−1) image points.

The scaling factor S which results here is thus:

$$S = \frac{(i-1) \cdot n + (n-1)}{i \cdot n} = \frac{i \cdot n - 1}{i \cdot n}, \quad (1)$$

that is to say, it is not an integer.

As has already been mentioned, the reduction of the image points can be limited to individual first image fields. In variants of the printing device according to the invention which are advantageous with regard to the expenditure on control, there is provision for the control device to be configured for converting the barcode data into actuating signals for the print head in such a way that all the first image fields of the barcode are printed with a smaller number of image points than corresponds to the barcode data.

The described reduction of the image points can also be achieved by software, that is to say an appropriate program which is accessed by the control device. But, with regard to a rapid conversion of the barcode data into actuating signals, correspondingly configured hardware is preferably provided which is specific to the application and brings about the described reduction of the image points. Here, the control device preferably contains a filter device for reducing the number of image points of the first image field.

The present invention can be used in conjunction with any desired applications, in which a two-dimensional barcode is to be produced via an inkjet printer. The invention can be used particularly advantageously in conjunction with the production of franking imprints, on account of the strict size stipulations for the barcode which exist in that field. The present invention therefore relates, furthermore, to a franking machine having a printing device according to the invention.

Furthermore, the present invention relates to a two-dimensional barcode which contains a matrix composed of a plurality of image fields, and contains at least one first image field, which is printed with a plurality of image points by a print head which operates according to the inkjet principle, and at least one second image field which is substantially unprinted. According to the invention, at least one first image field is printed with a reduced number of image points in such a way that a printed area results in the first image field, which printed area is substantially at most equal to the area of the second image field. The printed area of the first image field is preferably smaller than the area of the second image field.

The advantages and variants which are described above in conjunction with the printing device according to the invention can be realized with a barcode of this type to the same extent, with the result that reference is made here to the above statements.

The barcode has preferably been produced using barcode data which define the position and a constant size of the image fields, and the first image field is then printed with a smaller number of image points than corresponds to the barcode data.

Image points are preferably omitted in at least one first edge section of the first image field. Here, at least one first row of adjacent image points is preferably omitted in at least one first edge section of the first image field. Furthermore, the first edge section then preferably adjoins a second image field. Furthermore, image points are preferably omitted in all edge sections of the first image field which adjoin a second image field. Image points are preferably omitted in at least one first edge section of all first image fields. The first edge section then preferably points in a first direction.

In advantageous variants of the two-dimensional barcode according to the invention, there is provision, at least in a first direction, for every i-th image field to have a smaller size in the first direction than the second image field. Here, in a second direction which extends transversely with respect to the first direction, every k-th image field preferably has a smaller size in the second direction than the second image field. Here, i can equal k, in particular.

In further advantageous variants of the two-dimensional barcode according to the invention, all first image fields are printed with a reduced number of image points in such a way that a printed area results in the respective first image field, which printed area is substantially at most equal to the area of the second image field.

Finally, the present invention relates to a franking imprint having a two-dimensional barcode according to the invention. Other features which are considered as characteristic for the invention are set forth in the appended claims.

Although the invention is illustrated and described herein as embodied in a printing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is an illustration of a preferred embodiment of a two-dimensional barcode according to the invention;

FIG. 1A is an illustration of detail IA shown in FIG. 1;

FIG. 2 is an illustration of a further preferred embodiment of the two-dimensional barcode according to the invention;

FIG. 2A is an illustration of detail IIA shown in FIG. 2;

FIG. 3 is an illustration of a further preferred embodiment of the two-dimensional barcode according to the invention;

FIG. 3A is an illustration of detail IIIA shown in FIG. 3;

FIG. 4 is an illustration of a further preferred embodiment of the two-dimensional barcode according to the invention;

FIG. 4A is an illustration of a detail IVA shown in FIG. 4;

FIG. 5 is an illustration of a further preferred embodiment of the two-dimensional barcode according to the invention;

FIG. 5A is an illustration of detail VA shown in FIG. 5;

DESCRIPTION OF THE EMBODIMENTS

Figure 6:
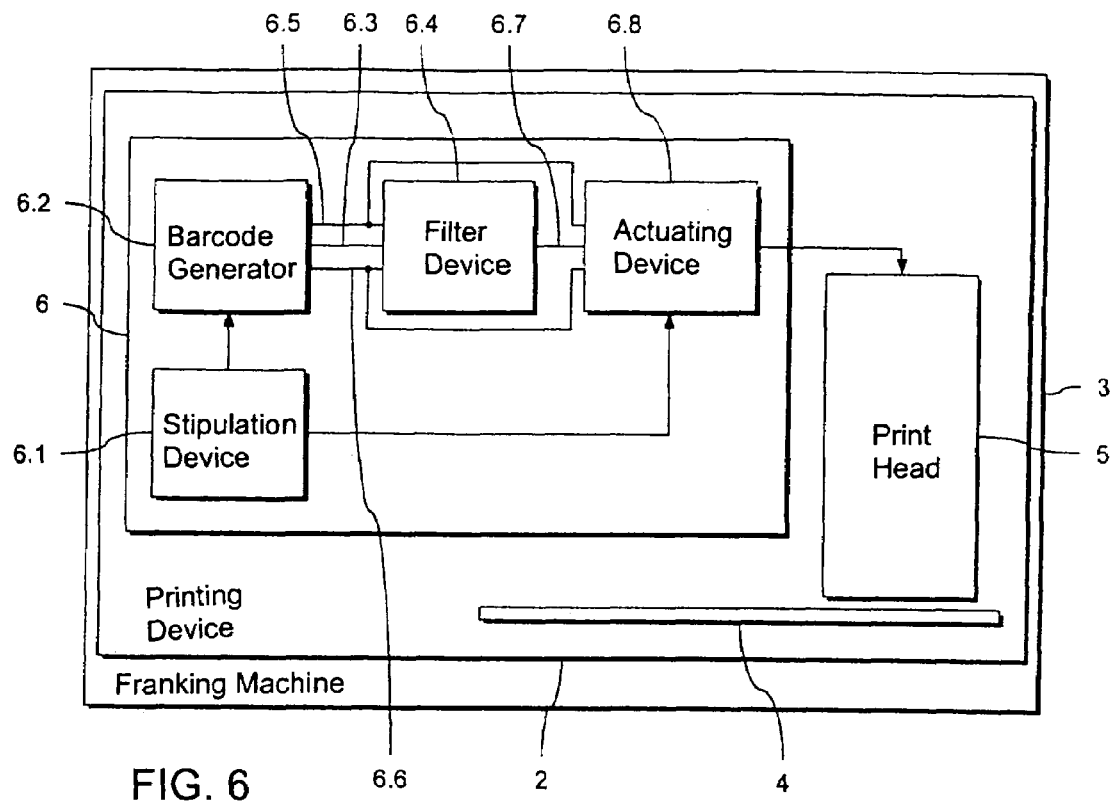
FIG. 6 is a block diagram of a preferred embodiment of the printing device according to the invention.

Referring now to the figures of the drawing in detail and first, particularly, to FIGS. 1, 1A and 6 thereof, there is shown a preferred embodiment of a two-dimensional barcode 1 according to the invention, which two-dimensional barcode 1 can be generated with a printing device 2 shown in FIG. 6.

The printing device 2 is a constituent part of a franking machine 3 which provides items of post, such as a letter 4, with franking imprints. For this purpose, the letter 4 is guided past printing nozzles of a print head 5 of the printing device 2, which print head 5 operates according to the inkjet principle. Here, a control device 6 of the printing device 2 actuates the print head 5 in such a way that the latter produces the franking imprint.

The control device 6 contains a stipulation device 6.1, via which the franking imprint is stipulated according to specific criteria. Here, in addition to the two-dimensional barcode 1, the franking imprint contains further parts such as plain text and free graphics. The basic information for forming the barcode 1 is stipulated by the stipulation device 6.1 to a barcode generator 6.2 which supplies the barcode data, that is to say the barcode information, as a serial data stream on the line 6.3 to a filter device 6.4. Here, the signal of line 6.5 supplies the synchronizing clock of the data, while the signal of line 6.6 initiates new lines of print.

The filter device 6.4 manipulates the barcode data in the context of the present invention, as will be explained in greater detail further below. Here, the signal of line 6.5 supplies the synchronizing clock of the data, while the signal of line 6.6 initiates new lines of print.

The manipulated barcode data are then forwarded from the filter device 6.4 via a line 6.7 to an actuating device 6.8 which integrates these data into the data stream with the remaining data of the franking imprint which come from the stipulation device 6.1, and generates the actuating signals for the print head 5 of the printer from them.

The barcode 1 is a two-dimensional barcode having 40×40 image fields in the form of modules 1.1, 1.2. The modules 1.1, 1.2 are disposed in the manner of a matrix, as indicated in FIG. 1A by the dotted lines 1.3 which are not present in reality. The barcode 1 has been produced using the data matrix code ECC200 on a franking area and has a height of 1.0 inch in a first direction 8 which is perpendicular with respect to printing direction 7.

The data matrix code ECC200 which is used in the barcode generator 6.2 stipulates barcode data in a standard manner, all 1600 modules being square and of the same size if the barcode data are used in unchanged form.

The print head 5 has a resolution of 192 dpi, so that a mean module height of 4.8 image points results for the 40 modules 1.1, 1.2 if the height of 1.0 inch perpendicularly with respect to the printing direction 7 is utilized to the full extent. As the printed, "dark" first modules 1.1 can always be generated, however, only from an integral number of image points, only four image points per first module 1.1 could be used without modification of the barcode data, which would lead to only 160 nozzles of the 192 nozzles of the print head 5 being used.

In order to attain full utilization of the height of 1.0 inch perpendicularly with respect to the printing direction 7 and of the resolution of the print head 5, the filter device 6.4 manipulates the barcode data in such a way that the modules 1.1, 1.2 in the first direction 8 as a rule have a height of five image points, but every fifth module in the first direction has a height of four image points, that is to say a height which is smaller by one image point. In order that the barcode 1 remains square, this modification is also carried out in a second direction which extends perpendicularly with respect to the first direction 8, that is to say the printing direction 7. Therefore, in other words, in the first direction 8 one image point is omitted in the case of every fifth module in the first direction 8, and in the second direction 7 one image point is omitted in the case of every fifth module in the second direction 7.

For the barcode 1, this results in a size distribution of the modules with 1024 modules having the size 5×5 image points, 256 modules having the size 5×4 image points, 256 modules having the size 4×5 image points and 64 modules having the size 4×4 image points. The greater part of the modules, namely 1024 modules, therefore have a size of 5×5 image points, which is advantageous with regard to the legibility of the barcode 1.

According to equation (1), i=5 and n=5 result in a scaling factor S=0.96, with the result that the mean module has 4.8 image points or pixels. The 40 modules can thus be produced transversely with respect to the printing direction 7 with full utilization of the 192 nozzles of the print head.

It is apparent here that, in other variants of the invention, there can also be provision for it to be possible for four image points of the modules to be omitted accordingly, specifically in those regions of the barcode which contain no useful information, in order to achieve adaptation to the resolution of the print head 5. For this purpose, the edge and/or central regions of the barcode, in particular, are suitable which mainly serve for positional and raster detection.

In the following text, a further preferred embodiment of the two-dimensional barcode 101 according to the invention will be described with reference to FIGS. 2, 2A and 6, which barcode 101 can be generated with the printing device 2 from FIG. 6. The control device 6 then merely has a correspondingly modified filter device 6.4.

The barcode 101 differs from the barcode 1 from FIG. 1 in that, owing to the filtering by the modified filter device 6.4, a complete row of image points is omitted, that is to say is not printed, in the printed first modules 101.1 in those edge regions 101.4, in which an edge of the module 101.1 adjoins an unprinted module 101.2. This is indicated in FIG. 2A by the hatched regions 101.5 which are not printed in reality.

In other words, although the module 101.1 shown has a specific size, for example 5×5 image points, the actually printed area is smaller. In the module 101.1 shown having four adjacent unprinted modules, these are then, for example, 3×3 image points.

The omission of the image points in the edge region which adjoins an unprinted module prevents ink from bleeding into the region of the unprinted module. This results in improved legibility of the barcode 101.

It is apparent here that the omission of the image points in the edge region, which is carried out with the neighboring modules being taken into consideration, can be combined with the scaling which is described above in conjunction with FIG. 1. Here, the omission of the image points which is described in conjunction with FIG. 2 can also be applied to modules of reduced size. In other words, the omission of the image points in the edge region from FIG. 2 can also be applied in the case of modules of reduced size, for example, having 5×4 or 4×4 image points, with the result that their printed area is reduced still further. However, it is likewise also possible in the case of these modules of already reduced size for the omission of the image points in the edge region not to be performed then.

In the following text, a further preferred embodiment of the two-dimensional barcode 201 according to the invention will be described with reference to FIGS. 3, 3A, 6 and 7, which barcode 201 can be generated with the printing device 2 from FIG. 6. The control device 6 then merely has a correspondingly modified filter device 6.4.

The barcode 201 differs from the barcode 1 from FIG. 1 in that, owing to the filtering by the modified filter device 6.4, a complete row of image points is omitted, that is to say is not printed, in the edge regions 201.6 and 201.7 in every printed first module, independently of its neighboring modules. This is indicated in FIG. 3A by the hatched regions 201.5 which are not printed in reality. Here, the edge regions 201.6 are the edges of the module which point in the printing direction 207, while the edge regions 201.7 are the edges of the module which point in the direction 208 which extends perpendicularly with respect to the printing direction 207.

In other words, although the module 201.1 shown still has a defined size, for example 5×5 image points, the actually printed area is smaller, namely then 4×4 image points.

The omission of the image points in the edge regions 201.6 and 201.7 prevents ink from bleeding into the region of the optionally unprinted module which adjoins there. It has been shown that considerably improved legibility of the barcode 201 can be attained, above all, with this filtering.

It is apparent here that the omission of the image points in the edge region can be combined with the scaling which is described above in conjunction with FIG. 1. Here, the omission of the image points which is described in conjunction with FIG. 3 can also be applied to modules of reduced size. In other words, the omission of the image points in the edge region from FIG. 3 can also be applied in the case of modules of reduced size, for example, having 5×4 or 4×4 image points, with the result that their printed area is reduced still further. However, it is likewise also possible in the case of these modules of already reduced size for the omission of the image points in the edge region not to be performed then.

Figure 7:
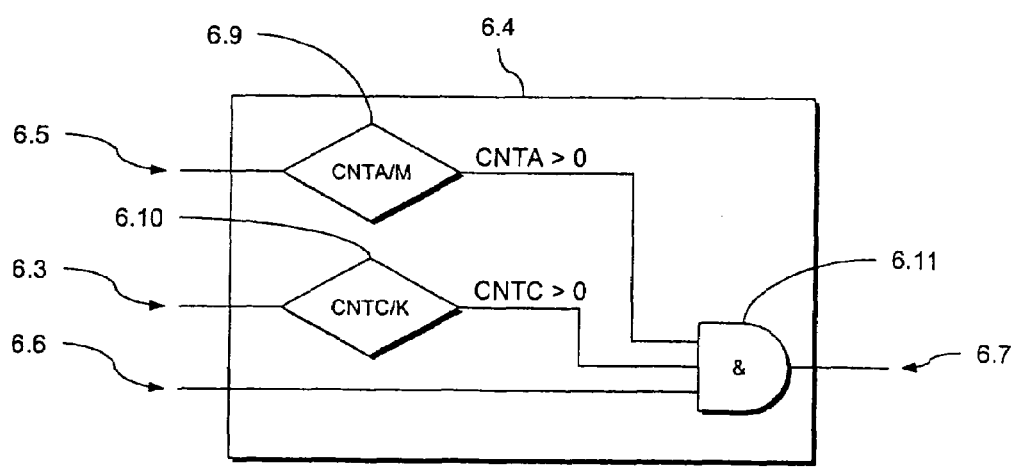
FIG. 7 is a block diagram of a detail of the printing device shown in FIG. 6.

FIG. 7 shows the configuration of the filter device 6.4 in detail for the filtering which has just been described in conjunction with FIG. 3, that is to say the modification of the barcode data of the barcode generator 6.2.

The components 6.9 (CNTA) and 6.10 (CNTB) are customary frequency dividers. They count down periodically from the set preset value M or K and then change from zero to the preset value, etc. During the duration of the counter reading zero, the respective output is zero. The preset value M or K is selected in such a way that the desired module widths or module lengths are counted. The AND gate 6.11 which is connected downstream thus filters the respective edge image points of the modules. The illustration of the reset line for the initialization after switching on has been omitted for reasons of clarity.

In the following text, a further preferred embodiment of the two-dimensional barcode 301 according to the invention will be described with reference to FIGS. 4, 4A and 6, which barcode 301 can be generated with the printing device 2 from FIG. 6. The control device 6 then merely has a correspondingly modified filter device 6.4.

The barcode 301 differs from the barcode 1 from FIG. 1 in that, owing to the filtering by the modified filter device 6.4, two complete rows of image points are omitted, that is to say are not printed, in the edge regions 301.6 in every printed first module, independently of its neighboring modules, and one complete row of image points is omitted, that is to say is not printed, in the edge regions 301.7. This is indicated in FIG. 4A by the hatched regions 301.5 which are not printed in reality. Here, the edge regions 301.6 are the edges of the module which point in the printing direction 307, while the edge regions 301.7 are the edges of the module which point in the direction 308 which extends perpendicularly with respect to the printing direction 307.

In other words, although the module 301.1 shown still has a defined size, for example 5×5 image points, the actually printed area is smaller, namely then 4×3 image points.

The omission of the image points in the edge regions 301.6 and 301.7 prevents ink from bleeding into the region of the optionally unprinted module which adjoins there. It has been shown that considerably improved legibility of the barcode 301 can also be attained with this filtering.

It is apparent here once again that the omission of the image points in the edge region can be combined with the scaling which is described above in conjunction with FIG. 1. Here, the omission of the image points which is described in conjunction with FIG. 4 can also be applied to modules of reduced size. In other words, the omission of the image points in the edge region from FIG. 4 can also be applied in the case of modules of reduced size, for example, having 5×4 or 4×4 image points, with the result that their printed area is reduced still further. However, it is likewise also possible in the case of these modules of already reduced size for the omission of the image points in the edge region not to be performed then.

In the following text, a further preferred embodiment of the two-dimensional barcode 401 according to the invention will be described with reference to FIGS. 5, 5A and 6, which barcode 401 can be generated with the printing device 2 from FIG. 6. The control device 6 then merely has a correspondingly modified filter device 6.4.

The barcode 401 differs from the barcode 1 from FIG. 1 in that, owing to the filtering by the modified filter device 6.4, one complete row of image points is omitted, that is to say is not printed, in the edge regions 401.6 in every printed first module, independently of its neighboring modules. This is indicated in FIG. 5A by the hatched regions 401.5 which are not printed in reality. Here, the edge regions 401.6 are the edges of the module which point in the printing direction 407.

In other words, although the module 401.1 shown still has a defined size, for example 5×5 image points, the actually printed area is smaller, namely then 5×4 image points.

The omission of the image points in the edge regions 401.6 prevents ink from bleeding into the region of the optionally unprinted module which adjoins there. It has been shown that considerably improved legibility of the barcode 401 can also be attained with this filtering.

It is apparent here once again that the omission of the image points in the edge region can be combined with the scaling which is described above in conjunction with FIG. 1. Here, the omission of the image points which is described in conjunction with FIG. 5 can also be applied to modules of reduced size. In other words, the omission of the image points in the edge region from FIG. 5 can also be applied in the case of modules of reduced size, for example, having 5×4 or 4×4 image points, with the result that their printed area is reduced still further. However, it is likewise also possible in the case of these modules of already reduced size for the omission of the image points in the edge region not to be performed then.

I claim:

1. A printing device, comprising:
    a print head operating according to an inkjet principle; and
    a control device actuating said print head for producing a two-dimensional barcode, the barcode containing a matrix composed of a plurality of image fields, the image fields containing at least one first image field being printed with a plurality of image points by said print head and at least one second image field being substantially unprinted, said control device converting barcode data defining a position and size of the image fields into actuating signals for said print head, said control device converting the barcode data into the actuating signals for said print head such that the at least one first image field being printed with a lower number of the image points than corresponds to the barcode data;
    the at least one first image field having at least one first edge section, said control device configured for omitting the image points in said at least one first edge section.

2. The printing device according to claim 1, wherein said control device is configured for converting the barcode data into the actuating signals for said print head such that the at least one first image field is printed with a smaller size than corresponds to the barcode data.

3. The printing device according to claim 2, wherein the at least one first image field is disposed in a region of the barcode which contains no useful information.

4. The printing device according to claim 1, wherein said control device is configured for omitting at least one first row of adjacent image points in the at least one first edge section of the at least one first image field.

5. The printing device according to claim 1, wherein the at least one first edge section adjoins the at least one second image field.

6. The printing device according to claim 1, wherein said control device is configured for omitting the image points in all edge sections of the at least one first image field which adjoin the at least one second image field.

7. The printing device according to claim 1, wherein said control device is configured for omitting the image points in the at least one first edge section of all first image fields.

8. The printing device according to claim 7, wherein the at least one first edge section points in a first direction.

9. The printing device according to claim 1, wherein said control device is configured for converting the barcode data into the actuating signals for said print head in such a way that, at least in a first direction, every i-th image field of the image fields has a smaller size in the first direction than corresponds to the barcode data, where i is an integer greater than zero.

10. The printing device according to claim 9, wherein said control device is configured for converting the barcode data into the actuating signals for said print head in such a way that, in a second direction which extends transversely with respect to the first direction, every k-th image field of the image fields has a smaller size in the second direction than corresponds to the barcode data, where k is an integer greater than zero.

11. The printing device according to claim 1, wherein said control device is configured for converting the barcode data into the actuating signals for said print head such that all the first image fields of the barcode are printed with a smaller number of the image points than corresponds to the barcode data.

12. The printing device according to claim 1, wherein said control device contains a filter device for reducing a number of the image points of the at least one first image field.

13. The printing device according to claim 10, wherein i=k and i and k are integers greater than zero.

14. A franking machine, comprising:
    a printing device, including:
        a print head operating according to an inkjet principle; and
        a control device actuating said print head for producing a two-dimensional barcode, the barcode containing a matrix composed of a plurality of image fields, the image fields containing at least one first image field being printed with a plurality of image points by said print head and at least one second image field being substantially unprinted, said control device converting barcode data defining a position and size of the image fields into actuating signals for said print head, said control device configured for converting the barcode data into the actuating signals for said print head such that the at least one first image field being printed with a lower number of the image points than corresponds to the barcode data.

15. A two-dimensional barcode, comprising:
    a matrix composed of a plurality of image fields, said image fields containing at least one first image field printed with a plurality of image points by a print head operating according to an inkjet principle, and at least one second image field being substantially unprinted, said at least one first image field being printed with a reduced number of said image points such that a printed area results in said first image field, said printed area being substantially at most equal to an area of said second image field, said image points being omitted in at least one first edge section of said first image field.

16. The two-dimensional barcode according to claim 15, wherein said printed area of said first image field is smaller than said area of said second image field.

17. The two-dimensional barcode according to claim 15, wherein the barcode is produced using barcode data defining a position and a constant size of said image fields, and said first image field is printed with a smaller number of said image points than corresponds to the barcode data.

18. The two-dimensional barcode according to claim 17, wherein said at least one first image field has a smaller size than corresponds to the barcode data.

19. The two-dimensional barcode according to claim 18, wherein said first image field is disposed in a region of the barcode which contains no useful information.

20. The two-dimensional barcode according to claim 15, wherein at least one first row of adjacent said image points is omitted in said at least one first edge section of said first image field.

21. The two-dimensional barcode according to claim 15, wherein said at least one first edge section adjoins said second image field.

22. The two-dimensional barcode according to claim 15, wherein said image points are omitted in all edge sections of said first image field which adjoin said second image field.

23. The two-dimensional barcode according to claim 15, wherein said image points are omitted in said at least one first edge section of all said first image fields.

24. The two-dimensional barcode according to claim 23, wherein said at least one first edge section points in a first direction.

25. The two-dimensional barcode according to claim 15, wherein at least in the first direction, every i-th said first image field has a smaller size in the first direction than said second image field, where i is an integer greater than zero.

26. The two-dimensional barcode according to claim 25, wherein in a second direction which extends transversely with respect to the first direction, every k-th said first image field has a smaller size in the second direction than said second image field, where k is an integer greater than zero.

27. The two-dimensional barcode according to claim 15, wherein all said first image fields are printed with a reduced number of the image points in such a way that the printed area results in a respective first image field, which said printed area is substantially at most equal to said area of said second image field.

28. The two-dimensional barcode according to claim 26, wherein i=K where i and k are integers greater than zero.

29. A franking imprint, comprising:
a two-dimensional barcode including a matrix composed of a plurality of image fields, said image fields containing at least one first image field printed with a plurality of image points by a print head operating according to an inkjet principle, and at least one second image field being substantially unprinted, said at least one first image field being printed with a reduced number of the image points such that a printed area results in the first image field, said printed area being substantially at most equal to an area of the second image field.

* * * * *